US012759865B2

(12) United States Patent
Engelke

(10) Patent No.: US 12,759,865 B2
(45) Date of Patent: Oct. 13, 2026

(54) RIDING SADDLE WITH DAMPED STIRRUP HOLDER

(71) Applicant: Carsten Engelke, Lindwedel (DE)

(72) Inventor: Carsten Engelke, Lindwedel (DE)

( * ) Notice: Subject to any disclaimer, the term of this patent is extended or adjusted under 35 U.S.C. 154(b) by 95 days.

(21) Appl. No.: 18/972,319

(22) Filed: Dec. 6, 2024

(65) Prior Publication Data

US 2025/0197191 A1 Jun. 19, 2025

(30) Foreign Application Priority Data

Dec. 15, 2023 (DE) ........................ 102023212802.0

(51) Int. Cl.
*B68C 1/10* (2006.01)
*B68C 1/16* (2006.01)
*B68C 1/18* (2006.01)

(52) U.S. Cl.
CPC .................. *B68C 1/10* (2013.01); *B68C 1/16* (2013.01); *B68C 1/18* (2013.01)

(58) Field of Classification Search
CPC ................ B68C 1/16; B68C 1/18; B68C 1/10
See application file for complete search history.

(56) References Cited

U.S. PATENT DOCUMENTS 241,274 A * 5/1881 Applegate ................ B68C 1/16 54/46.2
447,723 A * 3/1891 Forker ...................... B68C 1/10 54/44.4
1,301,838 A 4/1919 Guerrero
2,935,833 A * 5/1960 Woodhead ................ B68C 1/16 248/317
4,782,649 A * 11/1988 Zubrod ..................... B68C 1/16 54/46.2
4,924,660 A * 5/1990 Norman .................... B68C 1/16 54/46.2
5,107,660 A * 4/1992 Mommeja ................. B68C 1/16 54/46.1
11,993,508 B2 * 5/2024 Engelke .................... B68C 1/18
2010/0326023 A1 * 12/2010 Ferrand ................... F42B 39/28 54/37.1
2022/0250900 A1 * 8/2022 Engelke .................... B68C 1/18

FOREIGN PATENT DOCUMENTS

DE 9214548 U1 12/1992
DE 20103545 U1 6/2011
EP 3981736 A1 4/2022
FR 330368 A 8/1903

* cited by examiner

*Primary Examiner* — Jessica B Wong
(74) *Attorney, Agent, or Firm* — Greer, Burns & Crain, Ltd.; Steven P. Fallon

(57) ABSTRACT

A riding saddle comprising a saddle tree, a seat surface arranged thereon and, on each side of the saddle, a stirrup holder which is attached to the saddle and which is in particular in the form of a hook. The saddle is characterized by one or a common damping device on each side of the saddle between the saddle tree and each stirrup holder and/or between the saddle tree and a saddle flap carrying a stirrup knee roll and/or between a saddle flap and a knee roll attached thereto, which damping device has a link guide.

12 Claims, 9 Drawing Sheets

RIDING SADDLE WITH DAMPED STIRRUP HOLDER

Figure 1:
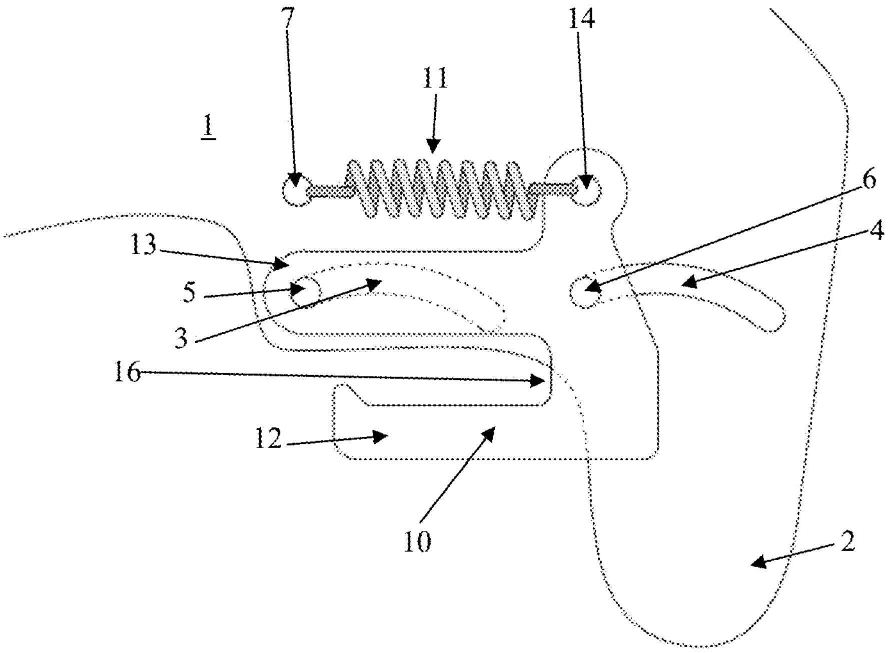

This application claims priority of the German patent application 10 2023 212 802.0, filed on Dec. 15, 2023.

The present invention relates to a riding saddle for use on a horse, in particular a saddle with knee rolls attached to the saddle flaps, which saddle is designed as a jumping saddle and has, for example, saddle flaps which are drawn far forward and may have high knee rolls.

The invention also relates to a method for manufacturing a riding saddle according to the invention from a conventional riding saddle.

The saddle according to the invention has a saddle tree, preferably with tree tips at its front end, and on the saddle tree a seat surface padded towards the saddle tree, which extends along a longitudinal axis of the saddle tree and of the saddle from its front end to its rear end and is preferably concave, for example with a pommel at the front end and/or a cantle at the rear end. The saddle tree is concave on its side facing a horse and convex on the side facing the seat. A stirrup leather is attached to the saddle on each side, in particular by means of a stirrup holder in the form of a hook, which is also known as a stirrup bracket. A stirrup is attached opposite the end of the stirrup leather that is hooked into the stirrup bracket. Preferably, as a stirrup holder the stirrup bracket is rigid, in particular in one piece, e.g. formed in the form of a hook; optionally, a small projection of the stirrup bracket can be pivotable at least at its end facing the cantle.

The stirrup holder on each side of the saddle may be attached directly to the saddle tree by means of the damping device according to the invention, or the damping device according to the invention may be indirectly connected to the saddle tree, for example by the damping device being attached to an element of the saddle connected to the saddle tree, for example to an element fixed between the saddle tree and the seat surface or to a large saddle flap, for example between the large saddle flap and the knee roll. For attachment to a horse, a saddle girth can be attached to the saddle, which saddle grith can be tightened around the horse's belly when the saddle rests on its back. The longitudinal axis of the saddle, resp. of the saddle tree, extends along the horse's back when the saddle rests on the horse. A saddle tree can be one-piece or multi-piece and can e.g. consist of wood, metal, carbon, preferably plastic, optionally fiber-reinforced, or of a combination of metal and plastic.

In general, a saddle is adapted to a horse so that when the saddle is placed on the horse, the seat surface has a desired inclination to the horizontal between the front and rear ends, respectively along the longitudinal axis. A stirrup holder has a first hook leg which, when the saddle rests on a horse's back, is arranged approximately horizontally up to the inclination of the seat surface, e.g. the first hook leg, onto which a stirrup leather is slid, can be arranged approximately parallel to the seat surface. In general, the stirrup holder is closed in the direction to the pommel and open in the direction of the cantle in order to slide a stirrup leather onto the hook leg in the direction to the pommel and to allow the stirrup leather to slide out of the hook, respectively off the first hook leg when the stirrup leather is loaded in the direction to the cantle, especially as a safety device for the rider falling from the saddle. According to the invention, connected to the first hook leg a second hook leg is preferably connected to the saddle tree by means of the damping device, so that the stirrup bracket has a stop at one end by the connecting area of the first and second hook legs, in particular is closed at one end of the first hook leg. In general, the second hook leg can be arranged parallel or at an angle to the first hook leg.

The saddle according to the invention has the advantage of behaving normally during normal riding, e.g. in a resting position of the horse and/or when walking, trotting or cantering, and thereat preferably not forming a suspension for the stirrup holder. This is also designated as the first position. The saddle has the advantage for jumping, especially during landing of the horse at the end of the jump, of distributing,-respectively damping the load exerted on the stirrup holders and/or on the knee rolls by the rider's mass over a period of time.

STATE OF THE ART

U.S. Pat. No. 1,301,838 describes a saddle in which the seat is slidable and spring-mounted on posts which stand vertically on a pack saddle with two plates to be arranged alongside the horse, which saddle is to lie on a horse's back.

EP 3981736 A1 describes a riding saddle with a damping device with a lever pivotably articulated to a carrier, which lever is spring-loaded and only damps a stirrup holder when the lever is pivoted away from the carrier via an apex.

Object of the Invention

The invention has the object of providing an alternative riding saddle, preferably a jumping saddle, which permits damping of loads occurring by fits and starts, in particular damping of impact-induced loads, such as those which occur when the horse jumps due to the weight of a rider when landing after the jump. Preferably, the riding saddle should provide damping only in certain phases of the horse's movement, in particular when a jumping horse lands on its front hooves, and further preferably provide less or no damping of the load in other phases of movement, for example during a horse's take-off or during a gait such as walk, trot or canter. Furthermore, the device for damping should have as flat a structure as possible and preferably be fitted underneath a large saddle flap.

DESCRIPTION OF THE INVENTION

The invention achieves the object by the features of the claims and, in particular, by a riding saddle which has a saddle tree, a seat surface arranged thereon and, on each side of the saddle, a stirrup holder which is fastened to the saddle and is designed in particular in the form of a hook. The saddle according to the invention is characterized in that on each side of the saddle between the saddle tree and each stirrup holder and/or between the saddle tree and a saddle flap carrying a knee roll and/or between a saddle flap and a knee roll attached thereto, one each or a common damping device is attached. Therein, each stirrup holder and knee roll may each be attached to a separate damping device, wherein the stirrup holder is attached to a damping device fixed to the saddle tree and the knee roll being attached to a damping device fixed to the large saddle flap. In embodiments in which a damping device is attached between the saddle tree and the large saddle flap, the large saddle flap is optionally pivotably and slidably attached to the saddle tree at a distance from the damping device, for example by means of a further damping device according to the invention.

The damping device comprises or consists of

- a link guide which has at least one link and at least one sliding piece guided longitudinally slidably thereon, wherein the link can be an elongated hole, a groove or a rail with which the sliding piece engages, with a spring element that loads the sliding piece into an end position on the link and/or in particular loads it in the direction of the cantle.

The damping device can have exactly one link and exactly one sliding piece or two spaced sliding pieces guided slidably longitudinally thereon, or the damping device can consist of these. Alternatively, the damping device can have two links and exactly one sliding piece or two spaced sliding pieces in each link, or the damping device can consist of these. In the case of a damping device comprising two links, the links may have the same shape and orientation and be offset from one another, in particular be arranged parallel to one another with an offset and/or be arranged with their longitudinal extension along a common axis in order to form a guide for parallel displacement. Alternatively, the link connected to a stirrup holder may have exactly one link, the link connected to a stirrup holder may have one link of two, or both of the links of two links connected to a stirrup holder may be arranged and/or formed to displace the stirrup holder in parallel or with a tilting motion about a tilting axis, which is in particular perpendicular to the link and perpendicular to the direction of movement, which extends, for example, along an arc. In the case of a damping device which has at least one sliding piece or which has two sliding pieces guided on exactly one link, the sliding pieces can be rotationally symmetrical or rotatable along the link, e.g. sliding pieces which are stretched along the link and which are optionally rotatably run on bearings. Alternatively, exactly one sliding piece guided on a link can be guided along the link in a rotationally fixed manner. Two sliding elements, which are guided on exactly one link, can also be guided along the link so that they cannot rotate.

The link can be rectilinear, preferably the link is arc-shaped, more preferably arc-shaped in an arrangement at the saddle in which at least one or both ends of the link are arranged at a greater spacing from the seat surface than the apex of the arc-shaped link. An arc-shaped link is preferably attached to the saddle in such a way that at least one end of the link is arranged further away from the seat surface than its apex, wherein in particular the end of the arc-shaped link which is arranged closer to the cantle or further from the pommel is further away from the seat surface than its apex. In the case of a damping device which connects a stirrup holder having the form of a hook to the saddle tree, the end of an arc-shaped link which is closer to the open end of the stirrup holder is preferably arranged further away from the seat surface than its apex.

Preferably, when a saddle is placed on a horse's back, a rectilinear link is arranged horizontally, e.g. parallel to the seat surface, or rising in the direction of the pommel and/or in the direction of the closed end of a stirrup holder, so that the damping device has no spring effect when loaded, e.g. by a stirrup leather, which acts vertically, but only a spring damping effect and/or spring effect when loaded in the direction towards the pommel and/or in the direction towards the closed end of the stirrup holder.

In general, one of the link and the sliding piece can be connected to the saddle tree or to the large saddle flap and the other one of the link and the sliding piece can be connected to the stirrup holder or a knee roll.

The link can be attached to a link carrier, e.g. consist of at least one link designed as a rail or have at least one rail attached to a link carrier, wherein the link carrier can be a plate or part of the saddle tree. Alternatively, the link can be formed in a link carrier in the form of an elongated hole or a groove. Therein, the link carrier can be formed as a plate which is e.g. attached to the saddle tree, or the link carrier can be formed in one piece with the saddle tree, for example as an elongated hole or groove in the saddle tree or in a leg, in particular the second hook leg of a stirrup holder, or as a rail section which is attached to the saddle tree or a leg, in particular the second hook leg of a stirrup holder. Optionally, the link can be formed, for example, as an elongated hole, groove or rail on the first leg of the stirrup holder, onto which the stirrup leather is slid, or on a second leg of the stirrup holder, which is connected to the first leg.

In one embodiment, the at least one link is formed as an elongated hole or groove in a link carrier connected to the saddle tree, which is for example a metal plate connected to the saddle tree, or which is formed in the saddle tree, and the at least one sliding piece, which is slidably guided on the at least one link, is attached to the stirrup holder, preferably on its second leg. Alternatively, the at least one link is attached as a rail to the saddle tree or to a link carrier connected to the saddle tree and the at least one sliding piece, which is slidably guided on the at least one link, is attached to the stirrup bracket. The spring element can be a tension spring or compression spring attached between the stirrup bracket and the link carrier or the saddle tree. In general, the spring element is preferably arranged at a spacing from the link and approximately parallel to the longitudinal extension of the link.

In general, one end of the spring element can be fixed to the stirrup holder, e.g. by means of the fastening device for a sliding piece on the stirrup holder or on a stop on the stirrup holder, and the other end of the spring element can be fixed to the saddle tree or to a link carrier connected to the saddle tree, e.g. on a stop on the saddle tree or on the link carrier. The spring element can be designed as a coil spring, a rubber spring or a gas pressure spring, for example. In the case of a damping device arranged between the saddle tree and the stirrup holder, the spring element is preferably arranged along the second leg of the stirrup holder to which the damping device is attached. In the case of a stirrup holder formed as a hook, the spring element is preferably arranged between the first leg and second leg of the stirrup holder.

In an alternative or additional embodiment, at least one link is formed as an elongated hole or groove in or as a rail on the stirrup bracket and the at least one sliding piece guided on the link is attached to the saddle tree.

In an alternative or additional embodiment, the large saddle flap is longitudinally slidable, e.g. on a further damping device, and is connected to the saddle tree at a spacing therefrom by means of a damping device. Therein, the damping device is preferably formed by an elongated hole, a groove or a rail as a link, which is fixed to the saddle tree, and at least one sliding piece, which is slidably guided in the link, which sliding piece is attached to the large saddle flap. Alternatively, the one link formed as an elongated hole, groove or rail can be arranged on the large saddle flap, preferably in a link carrier, which is attached to the inside of the large saddle flap facing the saddle tree, and the at least one sliding piece can be fixed to the saddle tree. The spring element is attached with its one end to the large saddle flap and with its other end to the saddle tree.

In general, the terminal position into which the spring element loads the sliding piece or the link is closer to the cantle than the position into which the stirrup bracket, a large saddle flap and/or a knee roll is movable along the link against the force of the spring element.

In an alternative or additional embodiment, a knee roll is connected to the large saddle flap by means of a damping device.

Figure 11:
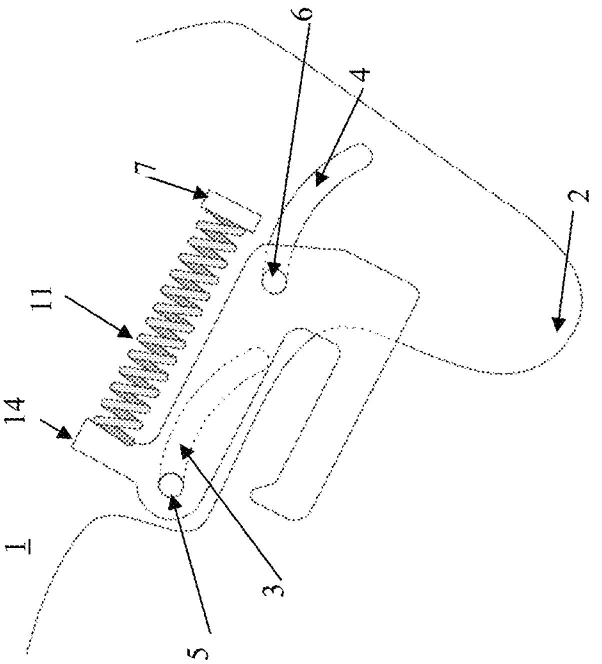
Figure 12:
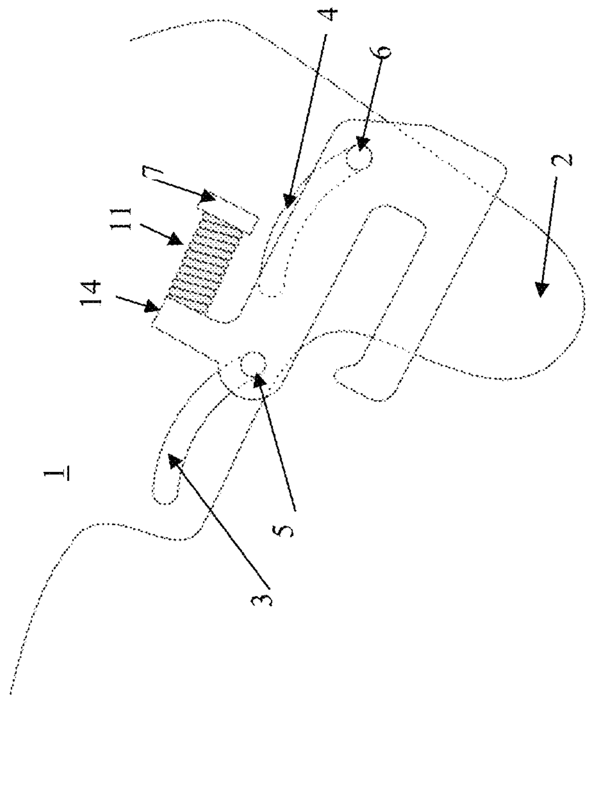

The invention is now described in more detail with reference to the figures, which schematically illustrate exemplary embodiments of the damping device in FIG. 1 with a tension spring as a spring element, FIG. 2 with a compression spring as spring element, FIG. 3 with a gas pressure spring, FIG. 4 with two rectilinear links, each with a sliding piece, FIG. 5 with a rectilinear link with two sliding pieces in it, FIG. 6 with a rectilinear link with two sliding pieces in it, FIG. 7 with a rectilinear link with two sliding pieces in it, FIG. 8 with a rectilinear link with two sliding pieces in it, FIG. 9 with a link designed as a rail, FIGS. 10, 11 and 12 during the movement sequence, FIG. 13 on a saddle tree for a stirrup holder, FIG. 14 on a saddle tree for a stirrup holder and additional damping devices for a large saddle flap, FIG. 15 on the saddle tree for a stirrup holder and in addition also on the large saddle flap for a knee roll.

In the figures, identical reference numerals denote elements with the same function. In general, each of the schematically illustrated links 3, 4 can independently of one another be an elongated hole, a groove or a rail, and each sliding piece 5, 6 can be slidably engaged therewith. In general, the figures show the damping device on the right-hand side of a saddle, so that the closed end 16 of a stirrup holder 10, which generally points in the direction of the pommel, is shown on the respective right-hand side of a FIG. 1*n* FIGS. 1 to 14, embodiments of the damping device are shown by way of example between a stirrup holder and a saddle tree, which is shown at least in sections.

Figure 2:
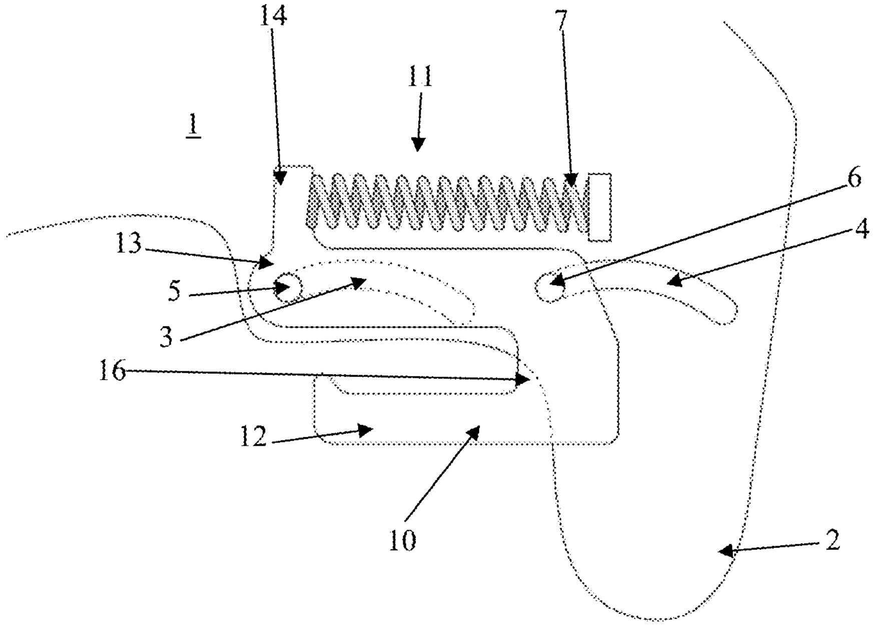
Figure 3:
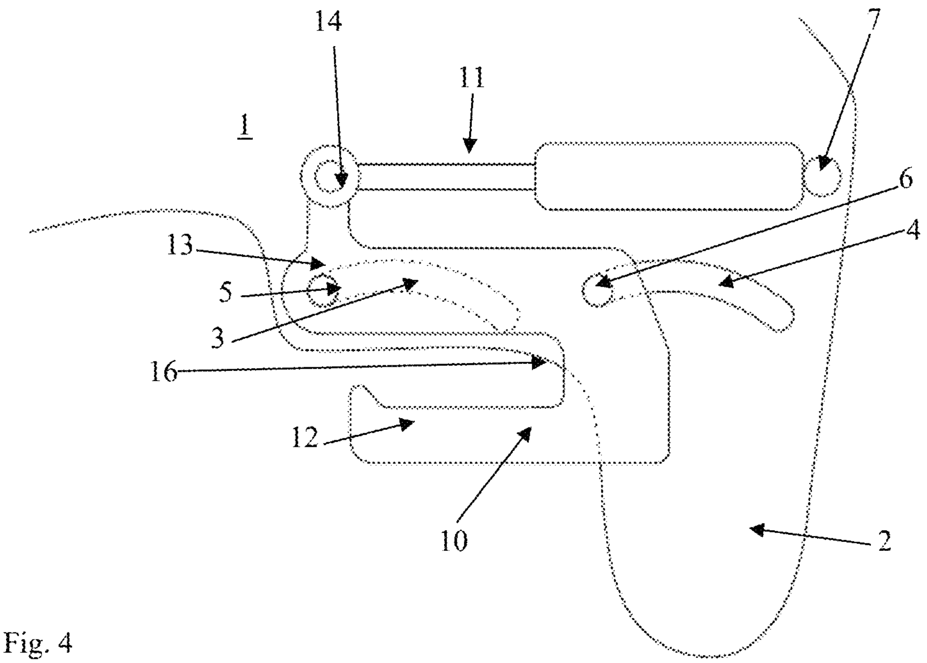

FIGS. 1 to 3 show a top view of the outer side of a saddle tree 1, shown in sections, with links 3, 4 attached to the saddle tree 1 adjacent to its tree tip 2, which are links arranged parallel to each other so that the respective sliding piece 5, 6 guided therein leads to a parallel displacement of the stirrup holder 10 when moving along the links 3, 4. In this illustration, the stirrup holder 10 is generally attached to the saddle tree 1 below and parallel to the seat surface. The links 3, 4 in an arrangement on the saddle are formed arc-shaped in which arrangement one or both ends of the link are mounted at a greater spacing from the seat surface than the apex of the arc-shaped links when the saddle is positioned on a horse's back. The stirrup holder 10 is designed here as a one-piece hook, the first leg 12 of which, which serves to receive a stirrup leather, is arranged below and optionally approximately parallel to the second leg 13.

In each embodiment, the spring element 11 counteracts the movement of the stirrup holder 10 with its closed end 16 leading, respectively counteracts the movement of the stirrup holder 10 in the direction away from the cantle and in the direction towards the front pommel.

In FIG. 1, the sliding pieces 5, 6 are fixed to the stirrup holder 10, so that when the stirrup holder 10 is arranged on the outside of the saddle tree, the links 3, 4 are partially covered by the stirrup holder 10 (shown here as dashed lines). The spring element 11 is designed as a tension spring, which is attached between the saddle tree 1 and the stirrup holder 10 and loads the stirrup holder 10 in the direction towards the cantle. The spring element is fixed at a stop 14 on the stirrup holder 10 and with its opposite end at a stop 7 on the saddle tree 1. The spring element 11 can be designed as a spiral spring or a rubber tension spring, for example. The stirrup holder 10 is designed as a hook which has an open end 15 only in the direction of the cantle, opposite to this has a closed end 16 and has a first leg 12 for receiving a stirrup leather. The sliding pieces 5, 6 are mounted in a second leg 13 of the stirrup holder 10.

In general, the sliding pieces 5, 6 can alternatively be fixed to the saddle tree 1 and the links 3, 4 can be attached to the stirrup holder 10.

FIG. 2 shows an embodiment in which the spring element 11 is formed by a compression spring, which is tensioned between a stop 7 on the saddle tree 1 and a stop 14 on the stirrup holder 10 and loads the stirrup holder 10 in the direction towards the cantle. The spring element 11 therefore counteracts the movement of the stirrup holder 10 with its closed end 16 leading, respectively in the direction of the pommel.

FIG. 3 shows an embodiment in which the spring element 10 is designed as a gas pressure spring, which is optionally pivotably attached to a stop 14 of the stirrup holder 10 and, also optionally pivotably, attached to a stop 7 on the saddle tree 1.

FIGS. 4 to 10 show embodiments in which the links run rectilinear and can preferably be arranged approximately parallel to the plane of the seat surface and/or horizontally when the saddle is placed on the horse.

Figure 4:
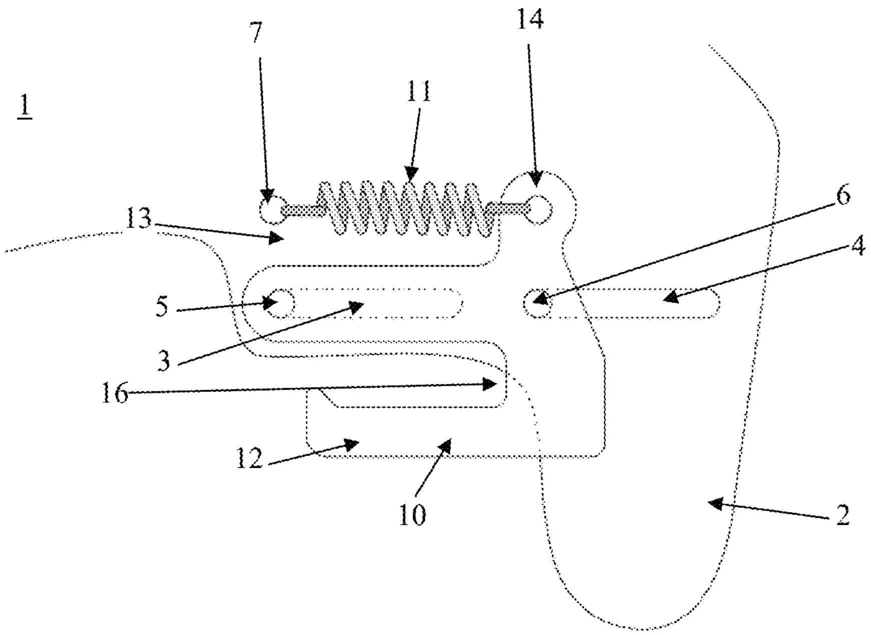

FIG. 4 shows the damping device with two rectilinear links 3, 4 arranged parallel and along a common axis, into each of which a sliding piece 5, 6 engages in a sliding manner. In this illustration, the sliding pieces 5, 6 are attached to the second leg of the stirrup holder 10 and the links 3, 4 are attached to the saddle tree. As is generally preferred, the first leg 12 protrudes beyond the saddle tree 1. Also in the case of rectilinear links 3, 4, in particular if these are arranged horizontally or ascending in the direction towards the pommel and/or in the direction towards the closed end 16 of the stirrup holder when the saddle is placed on a horse's back, the damping device has no spring effect under load, e.g. by a stirrup leather, which acts vertically, but only has a spring-loaded damping effect and/or spring effect when loaded in the direction towards the pommel and/or in the direction towards the closed end 16 of the stirrup holder, in particular during the landing phase of a jump.

Figure 5:
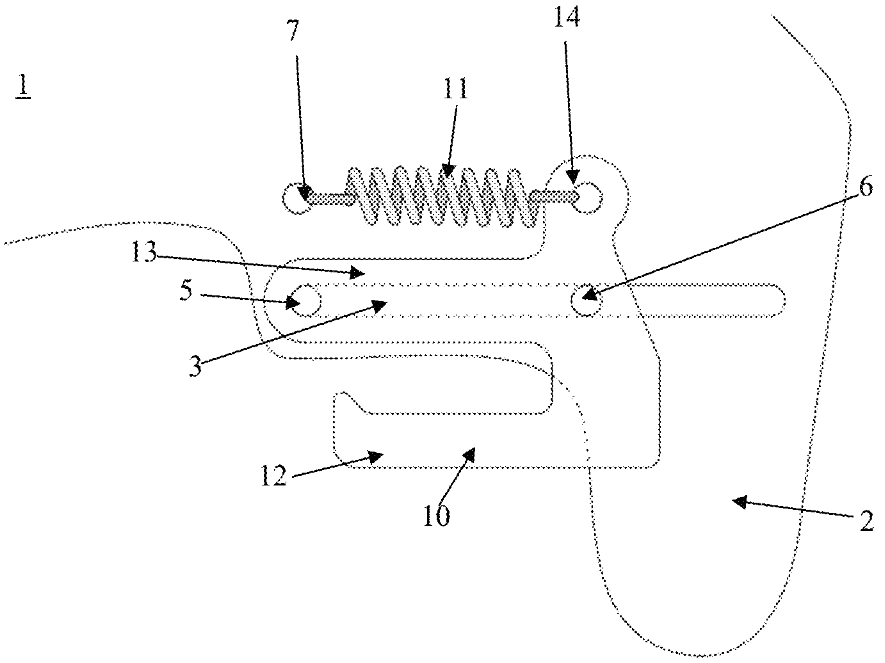

FIG. 5 shows an embodiment of the damping device with exactly one link 3, which is exemplarily rectilinear, with two sliding pieces 5, 6 which are slidably engaged with the link 3. The link 3 is formed on or in the saddle tree 1, the sliding pieces 5, 6 are attached to the second leg of the stirrup holder 10.

Figure 6:
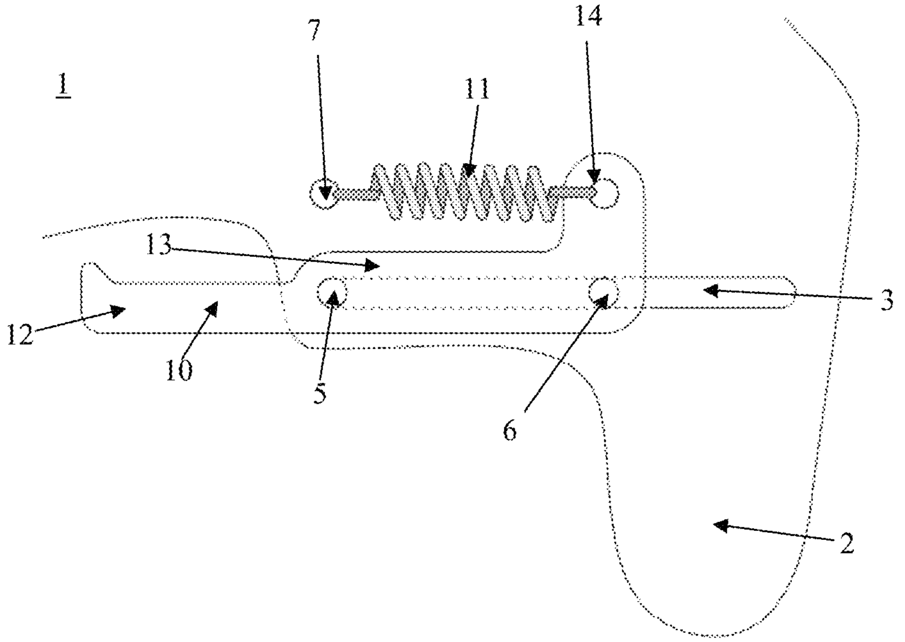

FIG. 6 shows a damping device with a tension spring as a spring element and with exactly one rectilinear link 3, which is arranged horizontally and parallel to the seat surface when the saddle is placed on the horse and in which two spaced-apart sliding pieces 5, 6 are slidably guided. The stirrup holder 10 is connected to the damping device on its second leg 13 by the sliding pieces 5, 6, which engage in the link 3. The first leg 12, on which a stirrup leather can be hooked, is arranged on the other side of the sliding pieces 5, 6, so that the first and second legs 12, 13 have an elongate shape instead of a hook. In the elongate shape, the first leg 12 of the stirrup holder 10.

Figure 7:
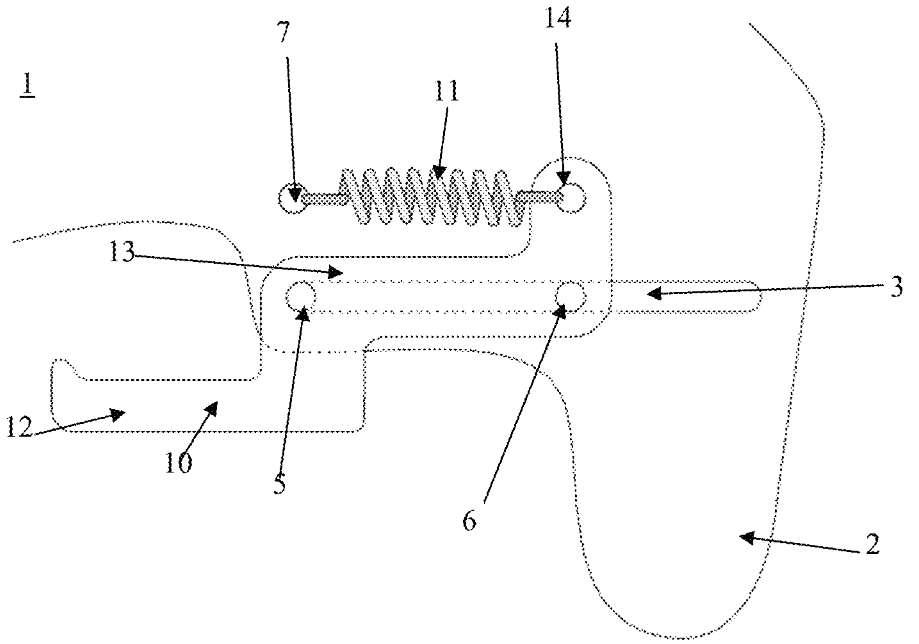

FIG. 7 shows a damping device corresponding to that of FIG. 6, but with a stirrup holder 10 in an elongate form, in which the first leg 12 is offset in parallel and arranged further away from the plane of the seat surface than the second leg 13, which is connected to the damping device.

Figure 8:
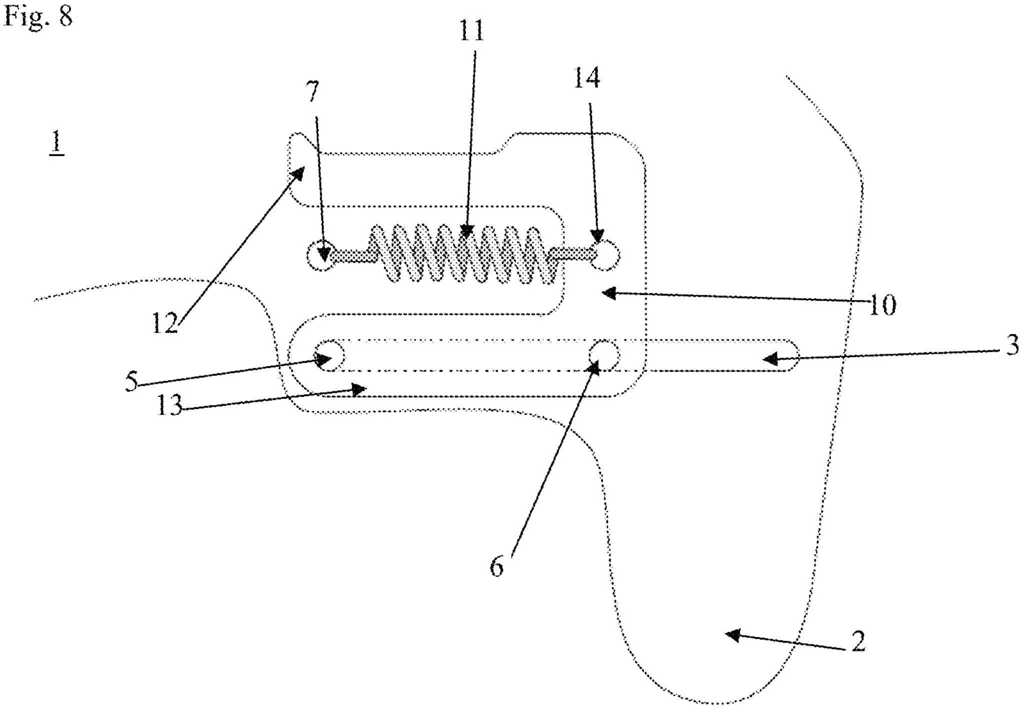

FIG. 8 shows a damping device consisting of exactly one link 3, with which two spaced sliding pieces 5, 6 engage in a longitudinally slidable manner, on a stirrup holder 10 formed as a hook, the first leg 12 of which is arranged closer to the seat surface than the second leg 13, so that the first leg 12 is above the second leg 13 when the saddle is positioned on the horse. The spring element 11 is a tension spring arranged between the first and second legs 12, 13.

Figure 9:
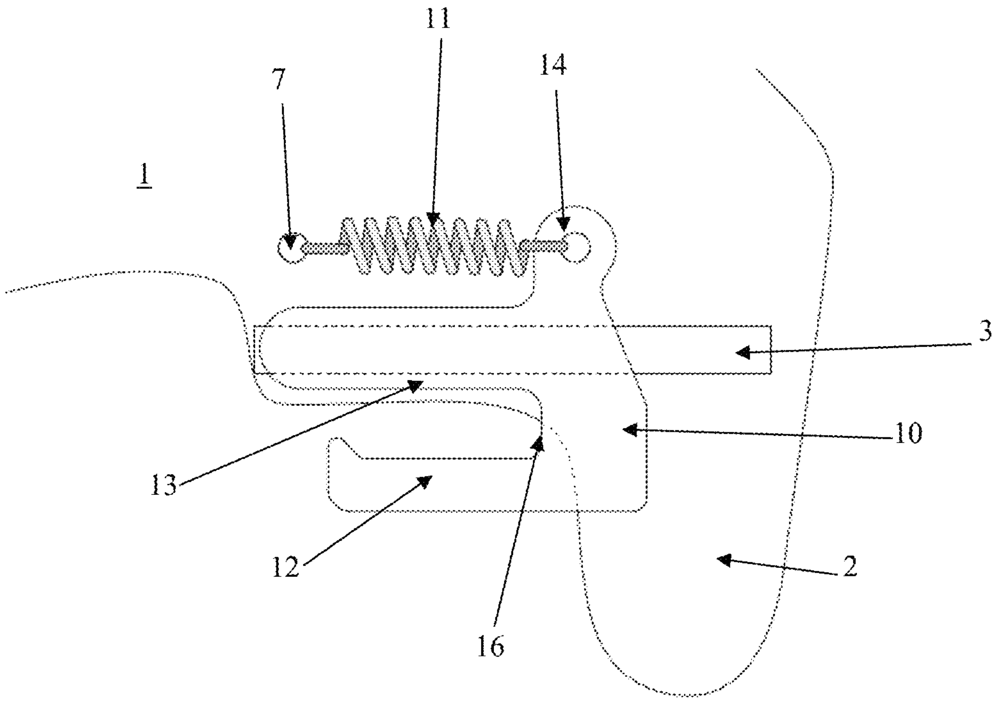

FIG. 9 shows exactly one link 3, which is formed as a rail and attached to the saddle tree 1. The stirrup holder 10, designed as a hook, is in sliding engagement with the link 3, e.g. by means of clamps or rollers that engage on opposite longitudinal edges of the rail.

Figure 10:
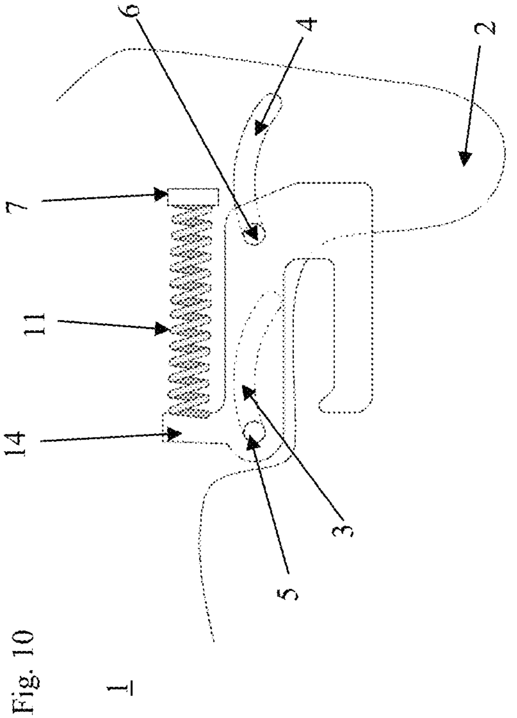

FIG. 10 shows the position of the damping device in the horizontal position of the saddle on a horse's back, in which the spring element 11 is not loaded, using the example of a stirrup holder 10 in the form of a hook, which is attached to the saddle tree 1 by means of a damping device. The damping device here consists of two parallel arc-shaped links 3, 4, with each of which exactly one sliding piece 5, 6 is slidably engaged. The end of each arc-shaped link 3, 4, which is closer to the cantle, is further away from the seat surface than its apex. With the tilting movement of the saddle tree 1, which is shown in FIG. 11 to FIG. 12, in which, for example, the tree tip 2, resp. the pommel is moved further downwards than, for example, the cantle is moved, the stirrup holder 10 moves along the link guide against the action of the spring element 11 to an end position in which, for example, the spring element 11 is loaded to the maximum between its stop 7 on the saddle tree 1 and the stop 14 on the stirrup holder 10. During this tilting motion, which occurs in particular when a horse lands at the end of a jump, the damping device dampens the load, respectively distributes the load over the duration of the movement along the link guide against the action of the spring element 11. The terminal position of the link guide at maximum load on the spring element 11 is shown in FIG. 12. When the inclination of the saddle is returned, e.g. to an approximately horizontal position of the seat surface, the spring element 11 can guide the link guide into the unloaded position in which the spring element is unloaded.

In general, the damping device according to the invention has the advantage of allowing a displacement, resp. suspension relative to the saddle tree 1 only in an inclined position of the saddle tree 1, so that in a horizontal arrangement of the seat surface there is no displacement or suspension of, for example, a stirrup holder.

Figure 13:
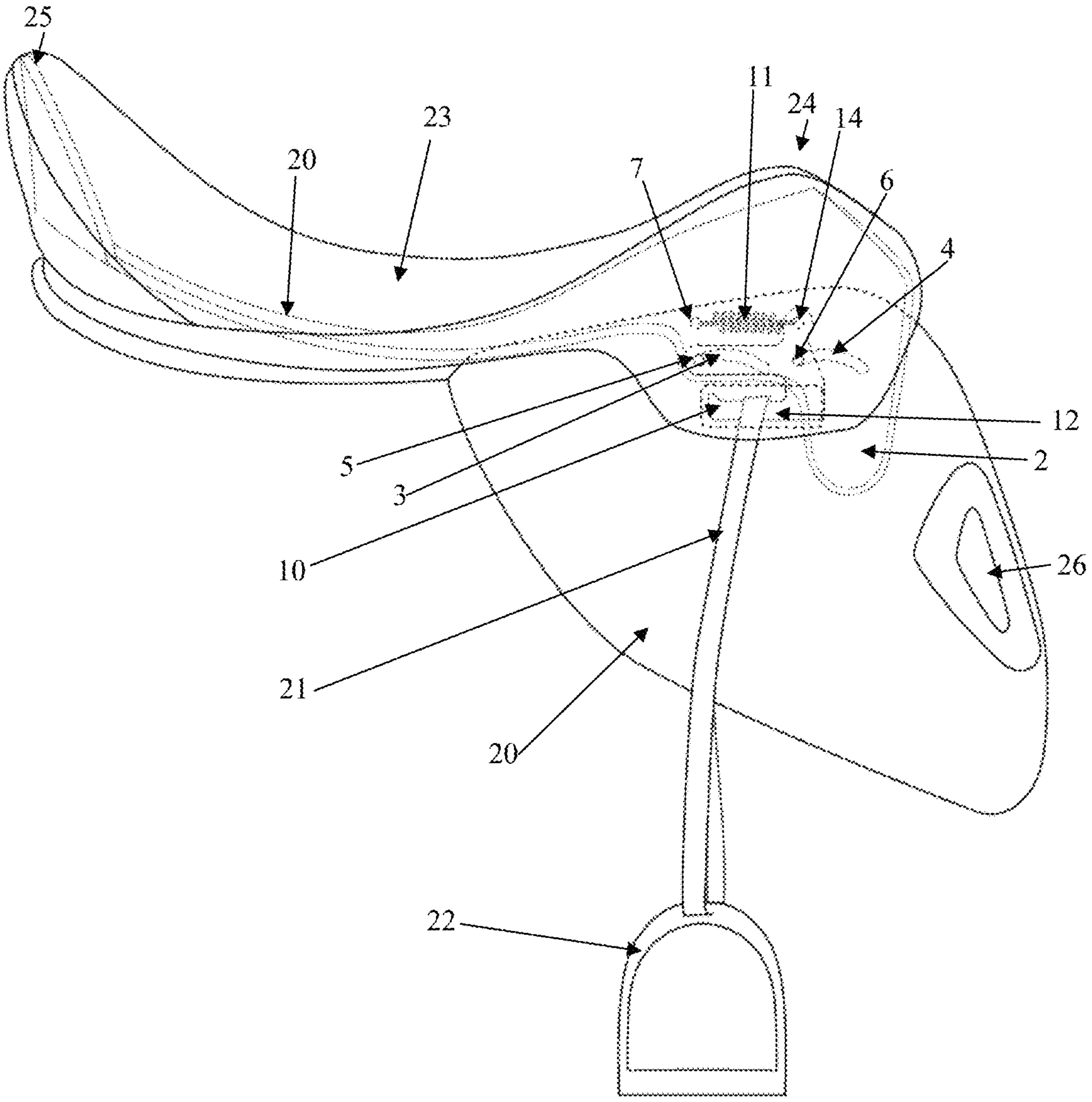

FIG. 13 shows a saddle with a saddle tree 1 to which a damping device is attached, as it is generally shown in FIG. 1. The large saddle flap 20, which is here firmly connected to the saddle tree 1, covers the dashed area of the saddle tree 1. The stirrup leather 21, which carries the stirrup 22, with its opposite end lies on the first leg 12 of the stirrup holder 10, which is attached to the saddle tree 1 by means of the damping device consisting of links 3, 4 and sliding pieces 5, 6 which engage and are slidably guided therein. The links 3, 4 are arranged approximately parallel to a seat surface 23 resting on the saddle tree 1. The stirrup leather 21 can run concealed by the large saddle flap 20 or can be guided on the large saddle flap 20 and, as shown, through an opening in the large saddle flap 20 to the stirrup holder 10. The saddle tree 1 generally extends from the pommel 24 along the seat surface 23 to the cantle 25.

Figure 14:
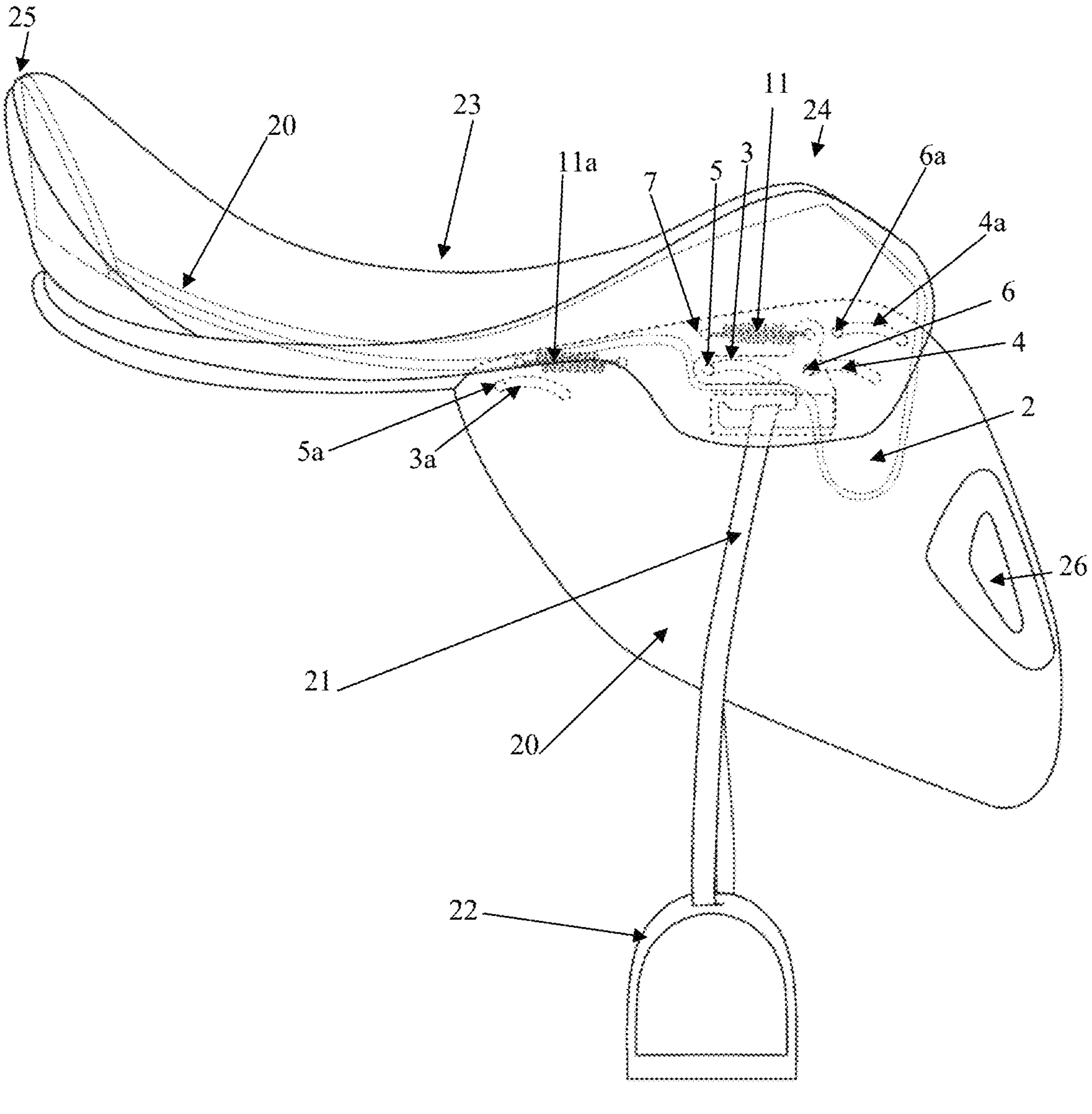

FIG. 14 shows a saddle in which the stirrup holder 10 is attached to the saddle tree by means of a damping device, generally as described with reference to FIG. 14, and independently thereof the large saddle flap 20 is connected to the saddle tree 1 by means of an additional damping device. The damping device, which connects the large saddle flap 20 to the saddle tree 1, has a spring element 11*a*, which loads the large saddle flap 20 in the direction of the cantle 25, and a link guide, which has two spaced, approximately parallel links 3*a*, 4*a* with displaceable sliding pieces 5*a*, 6*a* engaging therein. The damping device, which connects the large saddle flap 20 to the saddle tree 1, provides a resilient damping effect when a load in the direction away from the saddle tree is exerted on the knee roll 26 attached to the large saddle flap 20, in particular when a horse lands at the end of a jump.

Figure 15:
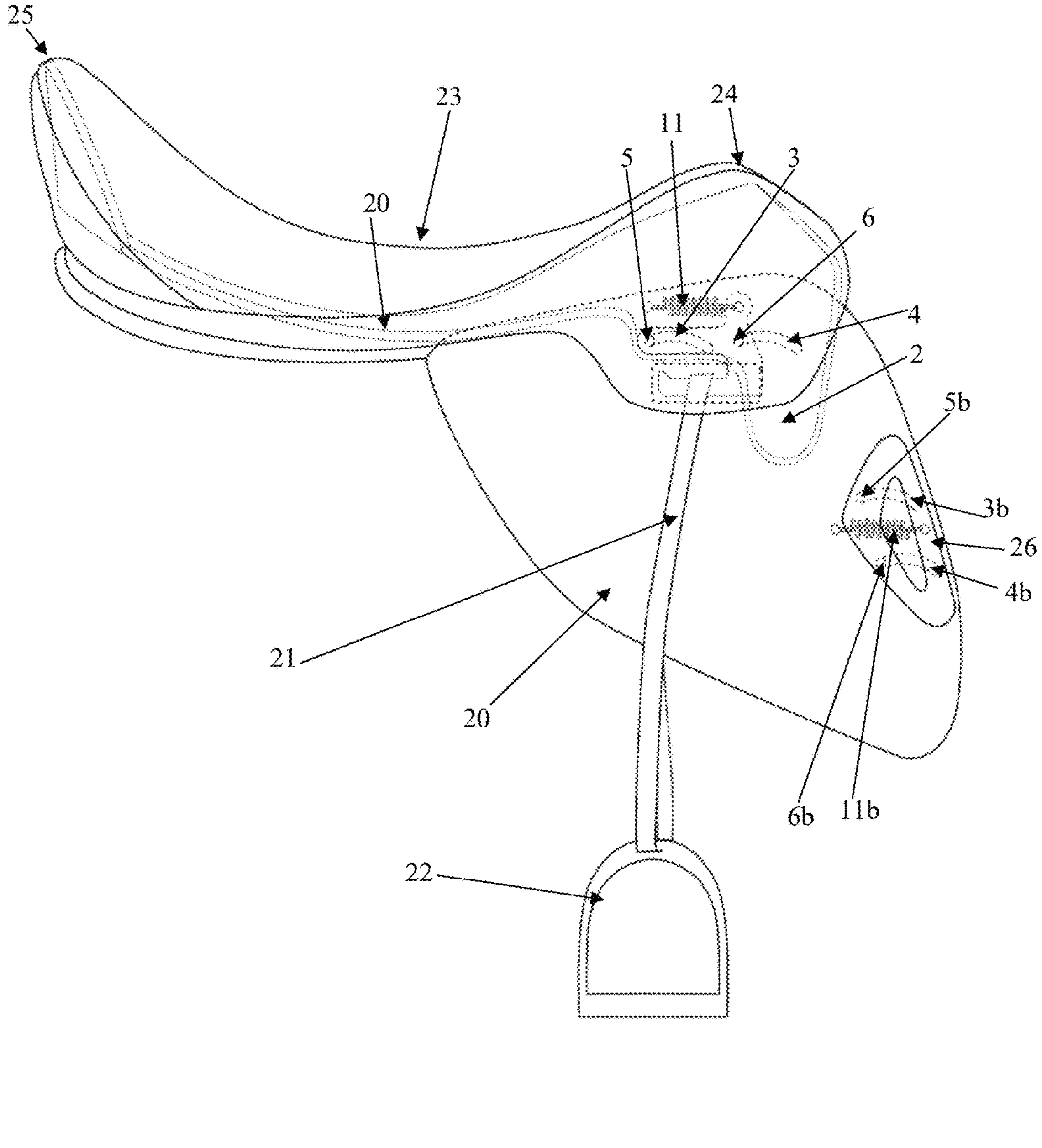

FIG. 15 shows a saddle in which the stirrup holder is attached to the saddle tree by means of the damping device consisting of two parallel links 3, 4 and sliding pieces 5, 6 slidable within them. The large saddle flap 20 is fixedly connected to the saddle tree and the knee roll 26 is connected to the large saddle flap 20 by means of a damping device according to the invention. This damping device is illustrated by the example of two links 3*b*, 4*b*, in each of which a sliding piece 5*b*, 6*b* engages. A spring element 11*b*, which connects the large saddle flap 20 to the knee roll, loads the knee roll 26 in the direction towards the cantle 25 and counteracts a movement of the knee roll 26 away from the saddle tree 1.

| Reference signs: |
|---|
| 1 saddle tree |
| 2 tree tip |
| 3, 3a, 3b link |
| 4, 4a, 4b link |
| 5, 5a, 5b sliding piece |
| 6, 6a, 6b sliding piece |
| 7 stop |
| 10 stirrup holder |
| 11, 11a, 11b spring element |
| 12 first leg |
| 13 second leg |
| 14 stop |
| 16 closed end |
| 20 large saddle |
| 21 stirrup leather |
| 22 stirrup |
| 23 seat surface |
| 24 pommel |
| 25 cantle |
| 26 knee roll |

The invention claimed is:

1. A riding saddle comprising:

a saddle tree and a seat surface arranged thereon, the seat surface extending between a front pommel and a cantle, with a large saddle flap on each side of the saddle, further comprising on each side of the saddle having a corresponding damping device attached to a corresponding stirrup holder, the corresponding large saddle flap and/or a corresponding knee roll, wherein each damping device comprises at least one link guide with a spring element which is set up to load each stirrup holder, each large saddle flap and/or each knee roll in the direction towards the cantle.

2. The riding saddle according to claim 1, wherein the link guide comprises a link the form of an elongated hole, groove or rail, which is fixed to the saddle tree and at least one sliding piece is in engagement with the link and is slidably guided along the link.

3. The riding saddle according to claim 2, wherein the elongated hole or the groove is formed in the saddle tree or in a plate as a link carrier attached to the saddle tree.

4. The saddle according to claim 1, wherein the link guide has a link formed as an elongated hole, groove or rail, which link is fixed to a stirrup holder formed in the form of a hook, and at least one sliding piece fixed to the saddle tree is guided slidably on the link.

5. The riding saddle according to claim 1, wherein the link guide comprises two links, each with at least one or each with exactly one sliding piece slidably guided thereon.

6. The riding saddle according to claim 5, wherein the two links are arranged parallel to each other with offset and/or are arranged with their longitudinal extension along a common axis to form a guide for parallel displacement.

7. The riding saddle according to claim 1, wherein the link is arc-shaped and at least one end of the link (is arranged further away from the seat surface than its apex.

8. The riding saddle according to claim 1, wherein the link guide comprises exactly one link in the form of an elongated hole, groove or rail in a metal plate, and two spaced-apart sliding pieces are slidably engaged with the link.

9. The riding saddle according to claim 1, wherein each large saddle flap is connected to the saddle tree by a damping device.

10. The riding saddle according to any claim 1, comprising a knee roll attached to each large saddle flap by a damping device.

11. The riding saddle according to claim 1, wherein the stirrup holder is formed as a hook, of which a first leg is configured to receive a stirrup leather and the second leg connected to the first leg is connected to the saddle tree by the damping device.

12. A method for manufacturing a riding saddle according to claim 1, comprising fixing the damping device to the saddle tree and setting at least one link guide to load the stirrup holder in the direction towards the cantle.

* * * * *